Patented Aug. 17, 1948

2,447,432

UNITED STATES PATENT OFFICE 2,447,432

DESTRUCTIVE DISTILLATION OF CASHEW NUT SHELL LIQUID AND PRODUCT THEREOF

William F. Schaufelberger, Pleasant Grove, N. J., assignor, by mesne assignments, to The Harvel Corporation, a corporation of New Jersey No Drawing. Application April 13, 1944, Serial No. 530,948

3 Claims. (Cl. 202—10)

This invention relates to novel compositions of matter and to methods for preparing the same. More particularly the invention is directed to novel products produced by distilling cashew nut shell liquid under particular conditions and to methods for preparing said novel products. In addition, the invention is directed to the novel reaction products produced by reacting an aldehyde with said novel products. The novel products of this invention find particular utility in the brake lining art, the field of electrical insulation and in other places.

Raw cashew nut shell liquid may be extracted from the shell of the whole cashew nut by (1) crushing the shell of the whole nut and then with a solvent, such as ether, extracting the cashew nut shell liquid therefrom and subsequently distilling off the solvent or (2) by first soaking the whole cashew nuts in water and then immersing the water soaked nuts in a hot bath of cashew nut shell liquid, whereupon the liquid within the shell flows out of the shell and into said bath. The raw cashew nut shell liquid may be treated to reduce its vesicant action. This method of treatment is disclosed in the United States Patent 2,128,247 of August 30, 1938, issued to M. T. Harvey et al.

In the course of my experimentations with cashew nut shell liquid, I have discovered that both treated and raw cashew nut shell liquid may be heat treated under certain temperature conditions to remove therefrom a distillate and to leave a substantially infusible solid residue. The weight of the residue obtained may be between about 75% to 50% of the original weight of the cashew nut shell liquid so treated. Said substantially infusible solid residue is capable of reacting with formaldehyde, paraformaldehyde or hexamethylene tetramine. According to this invention, cashew nut shell is distilled at a temperature between 560° F. and 620° F. until the residue becomes substantially infusible and solid. This distillation of the cashew nut shell liquid may be carried out within said temperature range and preferably under suitable partial pressure conditions until the quantity of distillate removed therefrom within said temperature range is such, and preferably about 25% to 50% of the original weight of the cashew nut shell liquid, that the residue is a substantially infusible solid.

In commercial practice, I prefer to employ either one of two equivalent methods in carrying out this invention and said methods are as follows: (a) The cashew nut shell liquid is heated at a temperature between 560° F. and 620° F. while under sub-atmospheric pressure, and preferably between about 0 and 5 inches of mercury pressure, until the weight of material distilled therefrom is between about 25% to about 50% of the original weight of the cashew nut shell liquid; (b) The cashew nut shell liquid is gas distilled by passing a gas such as steam, nitrogen or other inert gas at elevated temperature therethrough to heat the cashew nut shell liquid at a temperature between about 560° F. and 620° F. until the weight of distillate removed therefrom is between about 25% to about 50% of the original weight of the cashew nut shell liquid. Besides operating under the partial pressure conditions when gas distillation is employed, vacuum may also be employed therewith and sub-atmospheric pressures between 0 and 700 mm. of mercury pressure may be employed. It is to be understood that sub-atmospheric pressure and gas distillation are equivalents in the art of distillation where the purpose as here is to remove the distillate above the surface of the liquid being treated. Whatever may be the particular pressure conditions employed, in practical operation, I prefer that the temperature employed be between about 580° F. and 610° F., the distillate is collected and is cardanol in greater part, and the residue obtained is a solid substantially infusible mass. This residue may be vulcanized with sulphur, it may be reacted with formaldehyde, paraformaldehyde or hexamethylene tetramine to produce a harder product.

Example I

One thousand grams of cashew nut shell liquid was placed in a two liter flask. The flask was heated to raise the temperature of the cashew nut shell liquid therein to about 560° F. and a vacuum line was applied to said flask to lower the pressure therein to about 3 to 6 centimeters of mercury pressure. A stream of fine air bubbles was drawn through the cashew nut shell liquid to provide agitation. The agitation and said vacuum was continued for about 5 hours and the temperature of the cashew nut shell liquid was gradually raised from 560° F. to 610° F. over said 5 hour period. During this period the quantity of material distilled therefrom measured about 275 grams. The remaining residue, whose weight was about 72.5% of the weight of cashew nut shell liquid, became so viscous after said 5 hour treatment that the stream of air bubbles could no longer agitate the mass and distillation had practically ceased. This residue at 600° F. could not be poured out of the flask and when cooled to room temperature was a substantially solid, soft, rubbery mass. When subjected to a fluidmeter test, this residue at 130° F. over a 60 second period had a zero flow.

*Example II*

2100 grams of cashew nut shell liquid was heated under suction while being stirred. The cashew nut shell liquid was placed in an iron cylinder about 6 inches diameter and 12 inches long. Disposed along the altitude of the cylinder was a rotating shaft carrying a plurality of transverse arms disposed along the length thereof. The cylinder was heated to elevate the temperature of the cashew nut shell liquid therein to tempertures between 570° F. and 620° F. Suction was applied to said cylinder so that the cashew nut shell liquid therein was under a vacuum of 26 to 28 inches of mercury. The distillate passed through an opening in the head of said cylinder and was collected. After maintaining said cashew nut shell liquid for about 4½ hours under said vacuum of 26 to 28 inches of mercury, at temperatures between 570° F. and 620° F. and agitating the same with said shearing agitator blades, the residue therein measured about 1275 grams. The source of heat was removed from said cylinder and the residue therein was allowed to cool to room temperature but the agitation and vacuum was continued throughout the entire cooling period. Then the head of the cylinder was removed and the residue was found to be a substantially solid, infusible, dry, rubbery mass in comminuted or powder form. This powdered material was infusible up to 700° F. and is suitable as an ingredient in brake linings where soft, infusible, powdered materials capable of retaining their general shape and resiliency at high temperatures are desirable in maintaining good frictional properties.

The infusible product obtained in Example I may also be cominuted to provide material for brake lining purposes.

Either of the residues of Examples I and II may be reacted with formaldehyde, paraformaldehyde or hexamethylene tetramine and the resultant reaction product is much harder than the original residue.

The solid, infusible, residues obtained according to this invention are capable of being milled and are compatible with natural rubber and the so-called synthetic rubbers, among which are rubbery polymers of butadiene, rubbery copolymers of butadiene and styrene and rubbery copolymers of butadiene and acrylonitrile. Millable compositions of said residue and said natural rubber or one of said synthetic rubbers may be readily produced on the ordinary rubber mill. In hardening said residue with a reactive methylene group containing agent, I prefer to employ paraformaldehyde or hexamethylene tetramine and for this purpose a mixture of said residue and agent may be milled on a rubber mill at temperature of about 250° F. The quantity of said agent may be between 5 to 10 parts for each 100 parts of said residue.

Having thus described my invention, what I claim and desire to protect by Letters Patent is:

1. The method for producing substantially solid and infusible cashew nut shell liquid residue comprising destructively distilling cashew nut shell liquid between about 560° F. and 620° F. and at a pressure in the range of 0-5 inches of mercury until said residue is obtained and the quantity by weight of the residue is between about 75% and 50% of the quantity by weight of said cashew nut shell liquid.

2. The method for producing substantially solid and infusible cashew nut shell liquid residue comprising destructively distilling cashew nut shell liquid between about 580° F. and 610° F. and at a pressure in the range of 0-5 inches of mercury until said residue is obtained and the quantity by weight of the residue is between about 75% and 50% of the quantity by weight of said cashew nut shell liquid.

3. A substantially infusible solid residue obtained by the method of claim 1.

WILLIAM F. SCHAUFELBERGER.

REFERENCES CITED

The following references are of record in the file of this patent:

UNITED STATES PATENTS

| Number | Name | Date |
|---|---|---|
| 1,950,085 | Harvey | Mar. 6, 1934 |
| 2,098,824 | Harvey | Nov. 9, 1937 |
| 2,225,034 | Conners | Dec. 17, 1940 |
| 2,317,587 | Caplan | Apr. 27, 1943 |

OTHER REFERENCES

Fawcett, Journal of the Society of Chemical Industry, Feb. 1939, page 59. (Copy in Div. 25.)